United States Patent [19]

Gardner-Chavis et al.

[11] Patent Number: 5,192,515

[45] Date of Patent: Mar. 9, 1993

[54] REDUCTION OF NITROGEN OXIDE AND CARBON MONOXIDE IN EFFLUENT GASES

[75] Inventors: Ralph A. Gardner-Chavis, Cleveland; Michael P. May, Canton, both of Ohio

[73] Assignee: Molecular Technology Corporation, Canton, Ohio

[21] Appl. No.: 668,196

[22] Filed: Mar. 12, 1991

Related U.S. Application Data

[63] Continuation-in-part of Ser. No. 585,937, Sep. 20, 1990, abandoned.

[51] Int. Cl.$^5$ .............................................. C01B 21/02
[52] U.S. Cl. ................................. 423/213.2; 423/247; 423/239
[58] Field of Search ............. 423/213.7, 213.2, 239 R, 423/247; 502/302

[56] References Cited

U.S. PATENT DOCUMENTS

| | | | |
|---|---|---|---|
| 3,545,917 | 12/1970 | Stephens | 423/213.2 |
| 3,714,071 | 1/1973 | Michalko | 252/448 |
| 3,867,312 | 2/1975 | Stephens | 423/213.2 |
| 3,900,554 | 8/1975 | Lyon | 423/235 |
| 4,124,689 | 11/1978 | Whelan | 423/437 |
| 4,161,463 | 7/1979 | Myers et al. | 252/455 R |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,497,782 | 2/1985 | Howell et al. | 423/184 |
| 4,528,279 | 7/1985 | Suzuki et al. | 502/200 |
| 4,609,537 | 9/1986 | Tolpin et al. | 423/244 |
| 4,617,175 | 10/1986 | Tolpin et al. | 422/171 |
| 4,692,318 | 9/1987 | Tolpin et al. | 423/239 |
| 4,719,092 | 1/1988 | Bowers | 423/235 |
| 4,731,231 | 3/1988 | Perry | 423/235 |
| 4,743,436 | 5/1988 | Lyon | 423/235 |
| 4,760,044 | 7/1988 | Joy et al. | 502/303 |
| 4,791,091 | 12/1988 | Bricker et al. | 502/303 |
| 4,800,068 | 1/1989 | Perry | 422/173 |
| 4,849,192 | 7/1989 | Lyon | 423/235 |
| 4,851,201 | 7/1989 | Heap et al. | 423/235 |
| 4,861,567 | 8/1989 | Heap et al. | 423/235 |
| 4,867,954 | 9/1989 | Staniulis et al. | 423/239 |
| 4,868,148 | 9/1989 | Henk et al. | 502/303 |
| 4,874,590 | 10/1989 | Staniulis et al. | 423/239 |
| 4,919,902 | 4/1990 | Bricker et al. | 423/213.5 |
| 4,923,842 | 5/1990 | Summers | 502/261 |
| 4,935,393 | 6/1990 | Schwetje et al. | 502/65 |
| 4,950,461 | 8/1990 | Schwetje et al. | 423/239 |
| 4,995,916 | 2/1991 | Meikranz et al. | 134/22.16 |
| 5,019,175 | 5/1991 | Rogers et al. | 134/42 |

FOREIGN PATENT DOCUMENTS

| | | | |
|---|---|---|---|
| 1375259 | 11/1974 | United Kingdom . | |
| 2065629 | 7/1981 | United Kingdom | 423/213.7 |
| 9106693 | 12/1991 | World Int. Prop. O. . | |

OTHER PUBLICATIONS

"Reducing NO$_x$ Emissions", Power, Sep. 1988, pp. S-1 to S-13.

R. A. Perry and D. L. Siebers, Nature, vol. 324, 18-25, pp. 657-658.

*Primary Examiner*—Michael Lewis
*Assistant Examiner*—Stuart L. Hendrickson
*Attorney, Agent, or Firm*—Renner, Otto, Boisselle & Sklar

[57] ABSTRACT

A method is described for promoting a reaction between nitrogen oxide and carbon monoxide which comprises conducting the reaction in the presence of a dysprosium-containing catalyst which is free of noble metals and metals of the first transition series. More particularly, a method is described for reducing the nitrogen oxide and carbon monoxide content of effluent gas streams derived from the combustion of fossil fuels by contacting the effluent gases with a catalyst comprising dysprosium which is free of metals capable of promoting the oxidation of carbon monoxide. Generally, the catalyst is contacted with the effluent gases at temperatures of from about 300° F. to about 1200° F.

6 Claims, 2 Drawing Sheets

5,192,515

REDUCTION OF NITROGEN OXIDE AND CARBON MONOXIDE IN EFFLUENT GASES

RELATED APPLICATION

This application is a continuation-in-part application of application Ser. No. 07/585,937, filed Sep. 20, 1990, now abandoned.

FIELD OF THE INVENTION

The present invention relates to a method of reducing nitrogen oxide emissions and thereby reducing pollution of the atmosphere. More particularly, the present invention relates to the use of a dysprosium containing catalyst for reducing the nitrogen oxide and carbon monoxide content of combustion gases.

BACKGROUND OF THE INVENTION

There has been considerable effort devoted in recent years to solve various ecological and environmental problems such as air pollution, acid rain, etc. Combustion effluents and waste products from various sources are a major source of air pollution when discharged into the atmosphere. Unless the waste products are treated to remove deleterious components, the degradation of the environment will continue. Acid rain, forest and vegetation decline, changes in the ozone layer, harmful and irritating smog, etc., are examples of the results of the pollution of the atmosphere.

The common sources of pollution include internal combustion engines, industrial plants, utility boilers, gas turbines, and commercial establishments such as service stations, dry cleaners, etc. It has been estimated that power plants are responsible for about ⅓ of the annular $NO_x$ emissions while mobile sources such as automobiles and trucks are responsible for about 40% to about 50%. The types of air pollutants generated by such facilitates include particulate emissions such as coal ash, sulphur compounds such as $SO_2$ and $SO_3$, carbon monoxide, ozone, and nitrogen oxides, commonly referred to collectively as "$NO_x$".

One of the common components found in polluted air is nitrogen dioxide ($NO_2$) which is known to be an extremely poisonous material. Nitrogen dioxide in introduced into the atmosphere from the various sources such as commercial plants products nitric acid, but a major source of nitrogen dioxide is from nitric oxide (NO) formed by combustion processes of the types described above. The nitrogen oxide is formed during such combustion processes by (1) the reaction of nitrogen with atmospheric oxygen in the high temperature portion of the flame ("thermal fixation"); and (2) the oxidation of organic nitrogen compounds in the fuel on burning. The nitric oxide formed on combustion is converted to nitrogen dioxide on contact with air in the atmosphere.

Various procedures have been suggested to remove the oxides of nitrogen from waste gases so that the gases may be discharged into the atmosphere without harm to the environment. Nitrogen oxides emissions from boilers, gas turbines and internal combustion engines have been reduced by modifying the design of the engine or boiler to be more efficient or to operate at a lower temperature. Other proposals for reducing nitrogen oxide emissions involve use of various chemicals to reduce the nitrogen oxide content of effluent gas by converting the nitrogen oxides to innocuous gases. Such chemical processes, however, generally require extremely high temperatures such as in the range of about 1600° to about 2000° F. and higher. The temperatures of some of these chemical reactions for reducing nitrogen oxide content have been reduced by utilizing catalysts which are effective in promoting the reduction of nitrogen oxide. Various techniques for reducing $NO_x$ emissions from various combustion processes are described in the article entitled "Reducing $NO_x$ Emissions," *Power* Sep. 1988, pp S-1 to S-13.

Among the chemicals which have been suggested as being useful in reducing the nitrogen oxide content of combustion effluents are nitrogen-containing compounds such as ammonia, urea, cyanuric acid, etc. For example, U.S. Pat. Nos. 3,900,554; 4,335,084; 4,743,436; 4,849,192; and 4,851,201 describe processes utilizing ammonia to reduce nitrogen oxide emissions. The use of urea is described in U.S. Pat. Nos. 4,208,386; 4,325,924; 5,719,092; and 4,851,201. The use of cyanuric acid, and more specifically, the decomposition product of cyanuric acid, isocyanic acid, for reducing the nitrogen oxide content of combustion effluents is described in U.S. Pat. Nos. 4,731,231; 4,800,068; and 4,861,567; and by R. A. Perry and D. L. Siebers, *Nature* Vol. 324, 18/25, pp 657, 658.

Various catalysts have been suggested as being useful for treating combustion gases and removing harmful components such as nitrogen oxide, carbon monoxide, sulfur trioxide, etc. The catalysts may be used alone or in combination with various chemicals such as ammonia. U.S. Pat. Nos. 4,874,590 and 4,867,954 describe the use of microporous molecular sieves with ammonia to remove nitrogen oxides and sulfur oxides from gas streams. Catalytic procedures for simultaneously removing nitrogen oxides, sulfur oxides and particulates from flue gases are the subject of U.S. Pat. Nos. 4,609,537; 4,617,175; and 4,692,318. The process described in the '537 patent initially involves removing nitrogen oxide with a nitrogen oxide-capturing reducing agent which may be hydrogen, ammonia, ammonia-liberating compounds, carbon monoxide, light hydrocarbon gases or stream. The gases are then treated with a sulfur oxide-capturing and particulate-removing material selected from the group of absorbers and absorbers with at least one promoter thereon. The absorbers comprise oxides of at least one metal selected from the group consisting of aluminum, bismuth, manganese, yttrium, antimony, copper, tin, rare earth metals, Groups Ia metals and Groups IIa metals. The promoter comprises at least one member, in a free or combined form, selected from the group consisting of rare earth metals, Group VIII noble metals, chromium, vanadium, rhenium, antimony, silver, and combinations thereof. Dysprosium is listed as one of the rare earth metals (Col. 12, line 41). The '175 patent describes and claims a system for removing nitrogen oxide, sulfur oxide and particulates utilizing the process described and claimed in the '537 patent. U.S. Pat. No. 4,692,318 describes a modification of the process claimed in the '537 patent utilizing similar catalysts.

U.S. Pat. No. 4,124,689 describes a ceramic mixed oxide catalyst containing rare-earth elements. In particular, the ceramic catalysts comprise a rare earth metal and a metal of the first transition series. Optionally, and preferably, the catalysts also contain zirconium, tin or thorium, or mixtures thereof and/or an alkaline earth metal. The catalysts can be employed in the catalytic removal of carbon monoxide, hydrocarbons, nitric oxides and sulfur dioxide from exhaust gases of generating or heating plants and internal combustion engines which burn fossil fuels. In Col. 10, beginning at line 27, various reactions are indicated as being catalyzed with the claimed catalysts, and one of the reactions is the reaction of carbon monoxide with nitric oxide.

U.S. Pat. No. 4,760,044 describes a process and catalyst for minimizing the emission of hydrogen sulfide from automotive exhausts. The catalytic composite which is used in the process comprises a mixture of (1) a primary refractory inorganic oxide support having dispersed thereon at least one rare earth oxide, and (2) a secondary support selected from the group consisting of zirconia, titania, ceria, silica, magnesia, natural and synthetic zerolites having dispersed thereon at least one second active component which is an oxide of a metal, the metal being selected from the group consisting of metals which form a stable sulfide under fuel-rich conditions, said mixture having at least one catalytic metal selected from the group consisting of platinum, palladium, rhodium, ruthenium and iridium deposited thereon. Examples of the second active metal component include nickel, zinc, cobalt, copper, and lead.

U.S. Pat. No. 4,791,091 describes catalyst for treating exhaust gases from internal combustion engines. The catalyst composite described in this patent comprises a support which is a refractory inorganic oxide having dispersed thereon lanthanum oxide, at least one other rare earth oxide and at least one noble metal component. Examples of the support include alumina, zirconia, silica, titania, etc. and examples of the noble metals include platinum, palladium, rhodium, ruthenium and iridium. Examples of the rare earth metal oxides include cerium, praseodymium, neodymium, dysprosium, europium, holmium and ytterbium.

Layered automotive catalytic composites are described in U.S. Pat. No. 4,868,148. The composites comprise a first support which is a refractory inorganic oxide having dispersed thereon at least one noble metal component and having dispersed immediately thereon an overlayer comprising at least one oxygen storage component and optionally a second support which is a refractory inorganic oxide. The oxygen storage component is an oxide of a metal selected from the group consisting of iron, nickel, cobalt and the rare earths with the rare earths being preferred. Specifically preferred rare earths are cerium, lanthanum, and mixtures of cerium and lanthanum.

U.S. Pat. No. 4,528,279 describes monolithic catalysts useful for purifying exhaust gases from internal combustion engines. The catalyst comprises an inert carrier; a film of alumina and rare earth oxides coated onto the surface of said inert carrier wherein cerium and lanthanum are present in said film in an atomic ratio of 0.05 to 0.3; and the film carries a catalyst component containing at least one element of the platinum family.

U.S. Pat. No. 4,919,902 also describes the catalyst for treatment of exhaust gases from internal combustion engines. The catalyst comprises a support of a refractory inorganic oxide coated with a combination of: lanthanum; at least one noble metal; and at least one other rare earth metal. U.S. Pat. No. 4,923,842 also describes a lanthanum-containing catalyst for removing nitrogen oxides from gases. The catalyst comprises a platinum and rhodium combination with a lanthanum oxide overlayer and an oxygen storage component which may be a rare earth metal oxide such as dysprosium acetate.

SUMMARY OF THE INVENTION

A method is described for promoting a reaction between nitrogen oxide and carbon monoxide which comprises conducting reaction in the presence of a dysprosium-containing catalyst which is free of metals capable of promoting the oxidation of carbon monoxide. More particularly, a method is described for reducing the nitrogen oxide and carbon monoxide content of effluent gas streams derived from the combustion of fossil fuels by contacting the effluent gases with a dysprosium-containing catalyst which is free of metals capable of oxidizing carbon monoxide. Generally, the dysprosium-containing catalyst is contacted with the effluent gases at temperatures of from about 300° F. to about 1200° F.

DESCRIPTION OF THE PREFERRED EMBODIMENTS

Figure 1:
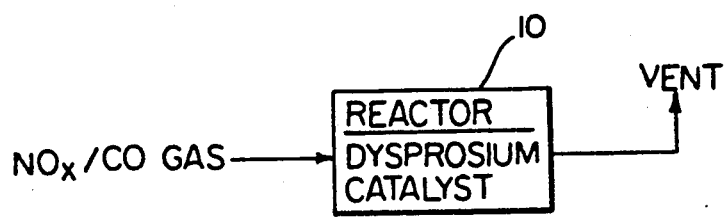
FIG. 1 is a flow diagram illustrating one method of the present invention for the catalytic reaction of nitrogen oxides with carbon monoxide.

Throughout the specification and claims, the terms "nitrogen oxide(s)" and "$NO_x$" are used in a generic sense to include the various nitrogen oxide components such as nitrous oxide ($N_2O$), nitric oxide (NO), and nitrogen dioxide ($NO_2$).

In a first embodiment, the present is a method for promoting a reaction between nitrogen oxide and carbon monoxide which comprises conducting the reaction in the presence of a dysprosium-containing catalyst which is free of noble metals and metals of the first transition series. In another embodiment, the catalyst also is free of lanthanum. In yet another embodiment, the dysprosium-containing catalyst is free of any metal capable of promoting the oxidation of carbon monoxide.

The reaction between carbon monoxide and nitrogen oxide generally is conducted at temperatures between about 300° F. and 1200° F., and more generally, at temperatures of from about 600° F. to 1200° F. At the lower temperatures, it may be beneficial to maintain the contact of the carbon monoxide and nitrogen oxide with the catalysts for longer periods of time in order to insure that the carbon monoxide and nitrogen oxide will react.

The catalysts which can be utilized to promote the reaction of carbon monoxide with nitrogen oxide, and, in particular, nitric oxide, are dysprosium-containing catalysts which are free of noble metals and metals of the first transition series such as titanium, vanadium, chromium, manganese, iron, cobalt, nickel, copper and zinc. In one embodiment, the dysprosium is in the plus two oxidation state.

In another embodiment, the dysprosium-containing catalyst is substantially free (i.e., it may contain small amounts) of metals capable of promoting the oxidation of carbon monoxide to carbon dioxide. One of the reasons it is desired to exclude such metals is that carbon monoxide is required for reaction with the nitrogen oxide and it is preferred to have sufficient carbon monoxide present in the gas to react with all of the nitrogen oxide present in the gas thereby maximizing the efficiency of this reaction in reducing the nitrogen oxide content of the gas. Any excess carbon monoxide can be removed from the gas by other catalyst by subsequent treatment of the gas as described more fully below. Catalysts capable of promoting the oxidation of carbon monoxide are well known to those in the art and various examples are described below.

The oxides of dysprosium are examples of dysprosium-containing compounds useful as catalysts in the present invention. The catalysts useful in the present invention may contain only dysprosium and oxygen such as $Dy_2O_3$ (containing some DyO), or the catalysts may comprise dysprosium and other metals provided that the dysprosium is the dominant metal, and any other metals present are not noble metals or metals of the first transition series. Dysprosium combined with anions other than oxygen also may be used. Examples of other anions include sulfur, sulfate, etc. The catalysts useful in the method of the present invention may be commercially available mixed-metal oxide catalysts which contain at least some dysprosium. Dysprosium oxide powder is available from Aldrich Chemical Company and Molycrop.

The catalysts utilized in the method of the present invention may be formed in any conventional manner such as by extrusion, tableting, pelleting, etc., or the active catalyst material can be supported on a carrier. The carrier is generally inert and may include silica, alumina, clay, alumina-silica, silicon carbide, zirconia, etc. The catalyst material can be deposited upon a carrier by techniques well known to those skilled in the art such as by depositing a solution containing the catalytic components on the carrier and thereafter drying and calcining the material. Utilizing these techniques, the catalytic components may be either coated on or impregnated into the carrier.

The reaction between nitrogen oxide and carbon monoxide can be conducted by passing a mixture of carbon monoxide and nitrogen oxide over the catalysts at an elevated temperature, or the carbon monoxide and nitrogen oxide can be separately heated and charged to a container containing the catalyst at an elevated temperature.

It has been suggested that carbon monoxide and nitric oxide react in the presence of dysprosium by the following overall reaction.

$$2CO + 2NO = N_2 + 2CO_2$$

Although applicants have discovered that the gaseous products obtained from the reaction of carbon monoxide and nitric oxide in the presence of a dysprosium-containing catalyst contains nitrogen and carbon dioxide and reduced amounts of carbon monoxide and nitric oxide, an analysis and evaluation of the mechanism of the catalytic reaction has not been completed and is not presently known with any certainty. Accordingly, applicants do not wish to be bound by any particular theory.

In a second embodiment, the present invention is a method of reducing the nitrogen oxide and carbon monoxide content of a combustion gas derived from a fossil fuel, and converting the nitrogen oxide and carbon monoxide to innocuous gases such as carbon dioxide and nitrogen. The method comprises contacting said combustion gas stream with a catalyst comprising dysprosium and which is free of noble metals and metals of the first transition series. Alternatively, as noted above the dysprosium-containing catalyst may be substantially free of metals capable of promoting the oxidation of carbon monoxide to carbon dioxide. The dysprosium-containing catalyst described above also said useful in this second embodiment. The catalysts are particularly useful in treating combustion gas streams resulting from the combustion of fossil fuels in internal combustion engines, gas turbines, hydrocarbon fueled power plants, coal fired utility boilers and other similar installations.

In the second embodiment, the combustion gas streams are contacted with the dysprosium-containing catalysts at temperatures of from about 300° F. to about 1200° F. More often, improved results are obtained when the combustion gas stream is contacted with the catalyst at temperatures of from about 600° or 700° F. to 1000° F.

This second embodiment of the invention is illustrated in FIG. 1. The gas containing nitrogen oxide ($NO_x$) and carbon monoxide is fed to the reactor 10 which contains a dysprosium-containing catalyst in accordance with the present invention. The temperature within the reactor is maintained at a temperature sufficient to effect the desired reaction but below about 1200° F. As mentioned above, the temperature within reactor 10 will generally be from about 300° to about 1200° F., and more generally from about 600° to 700° F. to 1000° F. The period of contact between the gas and the catalyst contained in the reactor is dependent upon a variety of factors including that temperature of the gases within the reactor, the type and amount of catalysts, etc. The gas which is removed from the reactor 10 is then vented to the atmosphere or recovered if desired. The gas which is removed from the reactor is characterized as containing a reduced amount of nitric oxide and carbon monoxide.

In a third embodiment of the present invention, the gas which is produced and obtained after the combustion gases have been contacted with the dysprosium-containing catalysts in accordance with the above embodiment treated to remove additional amounts of carbon monoxide, if desired, by contacting the treated gas with a second metal-containing catalyst in the presence of oxygen or air. The second metal-containing catalyst may be any catalyst which is capable of promoting the oxidization of carbon monoxide to carbon dioxide in the presence of oxygen. In one embodiment, the second metal-containing catalyst is free of dysprosium. Such catalysts include: CoO; $CoO_3$; CuO; $Cu_2O$; NiO; MnO; $MnO_2$; $Fe_2O_3$; $Cr_2O_3$; $CuCr_2O_4$; MnO; $MnO_2$; ZnO, $TiO_2$; $V_2O_5$; $La_{1-x}Sr_xCrO_3$; $La_{2-x}Sr_xCuO_4$; $La_2O_3$; $SrO_2$; solid oxides with perovskite structure such as $LaCoO_3$, $LaMnO_3$, $PrCoO_3$, $LaMn_{1-x}Cu_xO_3$, $La_{1-x}Pb_xMnO_3$, $Nd_{1-x}Pb_xMnO_3$, and $Pr_{1-x}Pb_xMnO_3$; $CuAl_2O_4$; Zeolites of the C type; Mordenites containing metal cations such as Cu, Co, Ag, Fe, Cr and Ni; solid oxides with spinel structures such as $Co_xZn_{1-x}Mn_2O_4$; noble metals such as Ru, Rh, Pd, Pt, Ir and Os; and metals such as $Fe^{+2}$, $Ti^{+2}$, $V^{+4}$, $Ag^+$, $Au^+$, $Zn^{++}$, $Sc^{+2}$, $Ni^{+2}$, $Tb^{+1}$ and $Nb^{+2}$.

Examples of suitable noble metal-containing catalysts which are especially useful include platinum, palladium, rhodium, ruthenium and iridium-containing catalysts. Any of the noble metal-containing catalyst which have been described and which are known to be useful for reducing the carbon monoxide content of effluent gases can be used in this embodiment. The amount of oxygen which should be present in the gas during this reaction may be varied over a wide range but it is believed desirable that the oxygen content of the gas be equal to or greater than ½ of the molar concentration of the carbon monoxide in the gas after the gas is contacted in the first step with the dysprosium catalyst. The reaction may be as follows:

Figure 2:
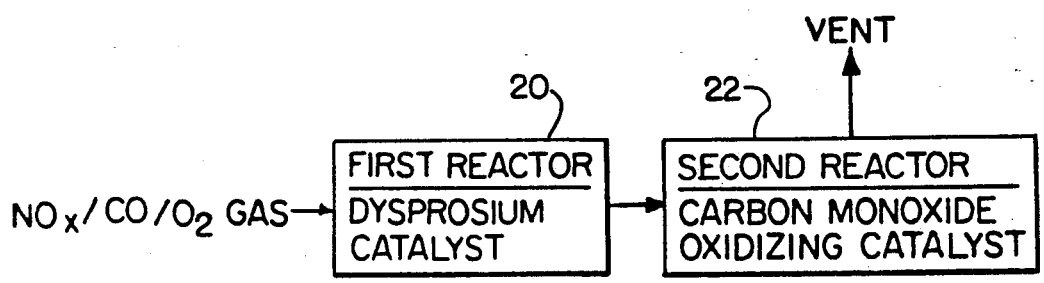
FIG. 2 is a flow diagram illustrating another embodiment of the present invention wherein the effluent gas is first treated with a dysprosium catalyst to reduce the nitrogen oxide and carbon monoxide content of the gas, and the gas (containing oxygen) is then contacted with a second catalyst (e.g., a nobel metal) to remove the remaining amounts of carbon monoxide by reacting the CO with oxygen.

FIG. 2 is a flow diagram illustrating this third embodiment of the invention. The gas such as a combustion gas containing nitrogen oxides, carbon monoxide and oxygen is contacted with a dysprosium-containing catalyst in accordance with the present invention in a first reactor 20 in the manner and under the conditions described above with regard to FIG. 1. After contact of the gas with the dysprosium-containing catalyst in the first reaction, the product gases derived from the first reactor are advanced to a second reactor 22 which contains any of the second metal-containing catalysts described above. The product gases from the first reactor 10 are contacted with the catalyst in the second reactor 20 for a period of time at a temperature which is sufficient to result in a reduction of the carbon monoxide content of the gas. After such contact, the gas which is removed from the second reactor 22 is vented to the atmosphere or recovered if desired. If the initial combustion gas does not contain enough oxygen to react with the CO in the second reactor, oxygen can be added to the initial combustion gas to the gas prior to entry into the second reactor, or to the second reactor.

Figure 3:
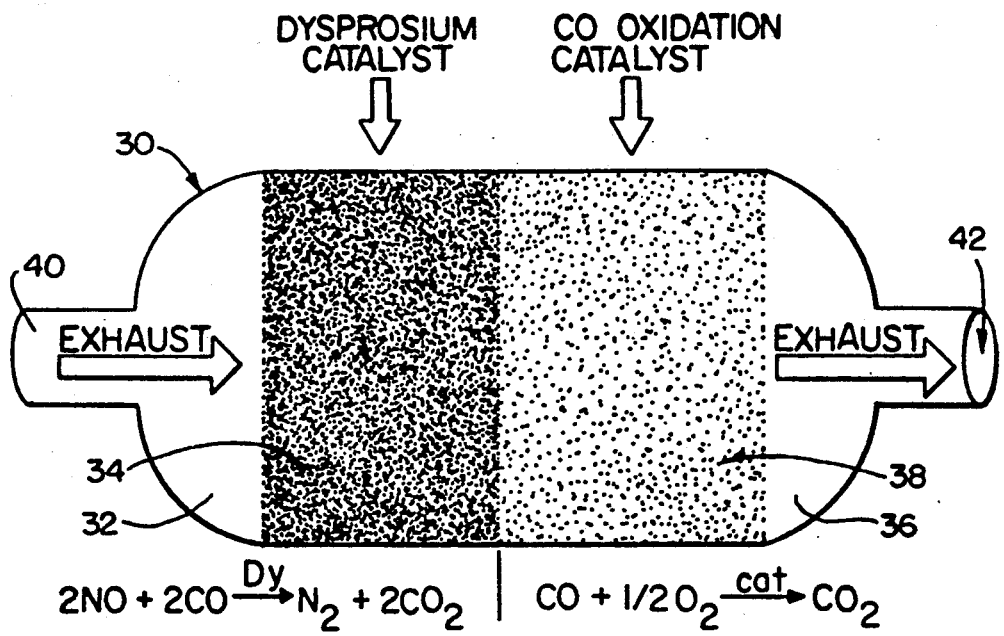
FIG. 3 is a cross-section of a reactor containing a first section containing dysprosium and a second section containing a carbon monoxide oxidation catalyst.

Another example, of the third embodiment of this invention is illustrated in FIG. 3 which represents a cross-section of a reactor (30) comprising a first catalyst section 32 containing a dysprosium-containing catalyst 34 and a second catalyst section 36 containing a carbon monoxide oxidation catalyst 38. The two sections in FIG. 3 are shown containing approximately equal amounts of the two catalysts but the relative sizes of the sections and catalysts can be varied as desired and depending on the relative amounts of nitrogen oxides and carbon monoxide in the exhaust. For example when the exhaust contains a large amount of nitrogen oxide and an amount of carbon monoxide which is slightly in excess of the nitrogen oxide, the amount of the dysprosium catalyst 34 should be greater than the amount of second metal catalyst 38 (e.g., 4/5 dysprosium; 1/5 second metal). Conversely if there is a large excess of CO in the exhaust then a greater amount of the second metal catalyst should be present (e.g., 3/5 dysprosium: 2/5 second metal). The relative amounts of the two catalysts useful for treating any particular exhaust can be readily determined by one skilled in the art.

Although FIG. 2 illustrates the use of separate reactors for the two catalytic reactions, and FIG. 3 illustrates the use of a single reactor wherein the two catalysts are in contact, other configurations are useful. For example, in FIG. 3, the two sections or catalysts can be separated by a membrane or the catalysts can be separated from each other by an empty space within reactor 30.

In the third embodiment as shown in FIG. 3, the exhaust gas enters the reactor through the inlet 40 and passes from left to right. The gas first contacts the dysprosium-containing catalyst 34 which reduces the nitrogen oxide and carbon monoxide content of the exhaust. The exhaust then contacts the second metal-containing catalyst 38 which removes any CO remaining in the exhaust. The exhaust, depleted in CO and $NO_x$, then exits the reactor 30 via exhaust port 42. As in other embodiments, the amount of CO and $NO_x$ removed from the gas will be dependent on a number of factors including the reactivity and amount of each catalyst; temperature of the exhaust; flow rate of exhaust through the reactor; and contact time of gas with the catalysts. These parameters can be readily determined experimentally by one skilled in the art.

The nitrogen oxide, carbon monoxide and oxygen containing gas streams which can be treated in accordance with the methods of the present invention which have been described above may be derived from various mobile and stationary sources. Mobile sources include internal combustion engines such as automobiles, trucks and buses. Fixed or stationary sources of nitrogen oxide and carbon monoxide containing gases include stack gases from commercial and residential furnaces, kilns, residual oil and coat-fired utility boilers, industrial boilers, gas turbines, incinerators, etc.

The following examples illustrates the methods of the present invention. Unless otherwise indicated in the following examples and elsewhere in the specification and claims, all parts and percentages are by weight, all temperatures are in degrees Fahrenheit, and all pressures are at or near atmospheric pressure. If a specific temperature is not recited, the temperature is ambient temperature.

EXAMPLE 1-2

In these examples, about 0.18 gram dysprosium oxide powder is charged to a 75 cc stainless steel reactor. An equimolar mixture of CO and NO is charged to the reactor which is then heated to the desired temperature. When the reactor reaches the desired temperature, the source of heat is removed and the reactor allowed to cool. The gaseous products of the reaction are collected and analyzed. The details of the reaction conditions and the results obtained are summarized in Table I.

EXAMPLES 3-15

Figure 4:
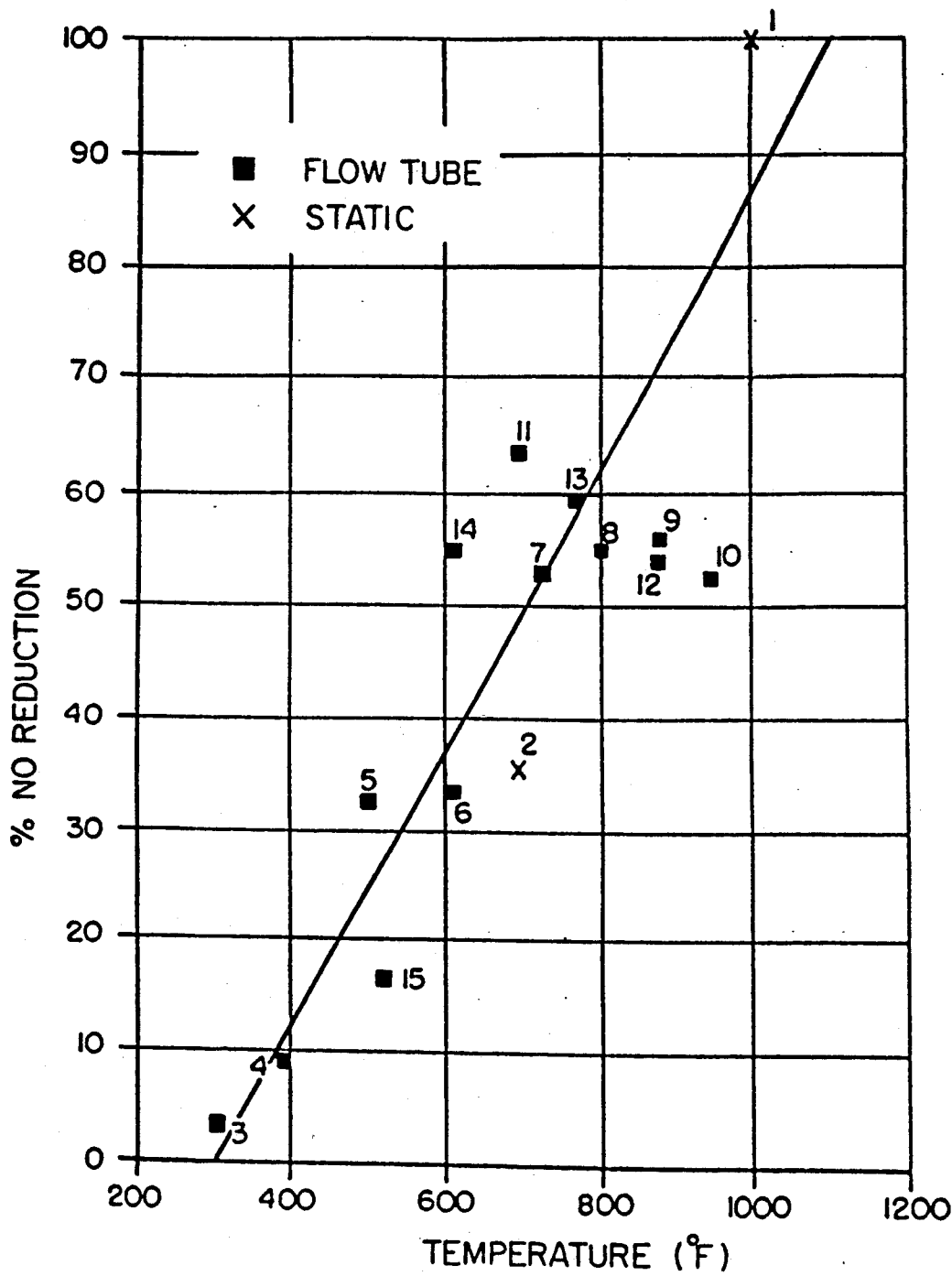
FIG. 4 is a graph of percent NO reduction versus temperature for Examples 1–15.

These examples are carried out in an apparatus comprised of a pyrex tube approximately one inch in diameter containing a fritted disk on which is distributed one gram of $Dy_2O_3$ powder. The reactor is wrapped with heating tape and held in a verticle position to support the $Dy_2O_3$ powder by gravity. A gas containing CO and NO in a molar ratio of CO:NO of 1 introduced at the top of the reactor and exited out the bottom to prevent the gravity supported powder from being dispersed and entrained. The details of the reaction conditions and the results are reported in Table I and FIG. 4. As can be seen from the results, the percent NO reduction increases with increasing temperature in both the static and the flow tube examples. There is some scattering of the results in the flow tube examples as a result of channeling of the catalyst resulting from the fact that the catalyst was not attached to the fritted disk (support)

and the relatively high velocity of the gas passing through the tube (2500<VVH<20,000).

TABLE I

| Example | Type Reactor | Temperature | NO Reduction |
|---------|--------------|-------------|--------------|
| 1  | Static | 995 | 100.0 |
| 2  | Static | 699 | 33.3 |
| 3  | Flow   | 307 | 3.4 |
| 4  | Flow   | 393 | 9.1 |
| 5  | Flow   | 500 | 32.6 |
| 6  | Flow   | 610 | 33.2 |
| 7  | Flow   | 725 | 52.9 |
| 8  | Flow   | 800 | 55.1 |
| 9  | Flow   | 880 | 56.1 |
| 10 | Flow   | 948 | 52.3 |
| 11 | Flow   | 691 | 63.5 |
| 12 | Flow   | 875 | 53.9 |
| 13 | Flow   | 767 | 59.4 |
| 14 | Flow   | 618 | 54.8 |
| 15 | Flow   | 522 | 16.6 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method for simultaneously reducing the nitrogen oxide and carbon monoxide content of a gas stream and converting the nitrogen oxide and carbon monoxide to nitrogen and carbon dioxide which comprises
   (A) contacting said gas stream with a dysprosium-containing catalyst at a temperature of from about 300° F. to about 1200° F. for a period of time sufficient to remove nitrogen oxide from the gas by reaction with the carbon monoxide, said catalyst being free of additional metals capable of promoting the oxidation of carbon monoxide, and thereafter
   (B) contacting the gas with a second metal-containing catalyst capable of promoting the oxidation of carbon monoxide in the presence of oxygen to reduce further the amount of carbon monoxide in the gas, provided that the second metal-containing catalyst does not contain dysprosium.

2. The method of claim 1 wherein the metal in the second catalyst is a noble metal.

3. The method of claim 2 wherein the noble metal utilized in the catalyst in the second reactor is selected from the group consisting of rhodium, palladium, platinum, ruthenium, iridium, or mixtures thereof.

4. The method of claim 1 wherein the second metal-containing catalyst is selected from the single oxides, mixed oxides, and solid oxide solutions of said second metal.

5. A method of promoting a reaction between nitrogen oxide and carbon monoxide which comprises conducting the reaction at a temperature of from about 300° F. to about 1200° F. in the presence of a dysprosium-containing catalyst which is free of additional metals capable of promoting the oxidation of carbon monoxide.

6. A method of reducing the nitrogen oxide and carbon monoxide content of a combustion gas stream derived from a fossil fuel, and converting the carbon monoxide and nitrogen oxide to nitrogen and carbon dioxide which comprises contacting said gas at a temperature of from about 300° F. to about 1200° F. with a catalyst comprising dysprosium which is free of additional metal capable of promoting the oxidation of carbon monoxide.

* * * * *